(12) United States Patent
Katrak

(10) Patent No.: US 8,738,221 B2
(45) Date of Patent: May 27, 2014

(54) METHODS AND SYSTEMS FOR SECURING VEHICLE DATA

(75) Inventor: Kerfegar K. Katrak, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1666 days.

(21) Appl. No.: 12/203,805

(22) Filed: Sep. 3, 2008

(65) Prior Publication Data

US 2010/0057272 A1  Mar. 4, 2010

(51) Int. Cl.
*G06F 17/00* (2006.01)
*G06F 19/00* (2011.01)
*G06F 7/00* (2006.01)

(52) U.S. Cl.
USPC ............. 701/36; 701/29.1; 701/32.7

(58) Field of Classification Search
USPC .......... 701/1, 29.1, 36, 29.2, 29.3, 29.6, 32.6, 701/32.7, 34.2; 340/438, 425.5, 426.1; 702/85; 700/28, 78
See application file for complete search history.

(56) References Cited

U.S. PATENT DOCUMENTS 7,242,329 B2   7/2007 Katrak
2006/0282457 A1*  12/2006 Williams ............ 707/102

* cited by examiner

*Primary Examiner* — Thomas Tarcza
*Assistant Examiner* — Edward Pipala
(74) *Attorney, Agent, or Firm* — Ingrassia Fisher & Lorenz, P.C.

(57) ABSTRACT

A method for securing vehicle data that includes a plurality of data messages includes the steps of determining a sequence for the plurality of data messages, selecting a plurality of identifier values for the plurality of data messages such that each of the plurality of identifier values are at least two bit errors removed from another, and assigning one of the plurality of identifier values to each of the plurality of data messages, based at least in part on the sequence.

20 Claims, 15 Drawing Sheets

| Normal Counter Values | | | | Decimal |
|---|---|---|---|---|
| Bit 3 | Bit 2 | Bit 1 | Bit 0 | Output |
| 0 | 0 | 0 | 1 | 1 |
| 0 | 0 | 1 | 0 | 2 |
| 0 | 1 | 0 | 0 | 4 |
| 0 | 1 | 1 | 1 | 7 |
| 1 | 0 | 0 | 0 | 8 |
| 1 | 0 | 1 | 1 | 11 |
| 1 | 1 | 0 | 1 | 13 |
| 1 | 1 | 1 | 0 | 14 |

FIG. 4

| | | | SA0 | Decimal | |
|---|---|---|---|---|---|
| Bit 3 | Bit 2 | Bit 1 | Bit 0 | Output | Error Diagnosis |
| 0 | 0 | 0 | 0 | 0 | Bit Failure |
| 0 | 0 | 1 | 0 | 2 | No Effect / Undetectable |
| 0 | 1 | 0 | 0 | 4 | No Effect / Undetectable |
| 0 | 1 | 1 | 0 | 6 | Bit Failure |
| 1 | 0 | 0 | 0 | 8 | No Effect / Undetectable |
| 1 | 0 | 1 | 0 | 10 | Bit Failure |
| 1 | 1 | 0 | 0 | 12 | Bit Failure |
| 1 | 1 | 1 | 0 | 14 | No Effect / Undetectable |

FIG. 5

| | | | SA1 | Decimal | |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 0 | 0 | 1 | 1 | 3 | Bit Failure |
| 0 | 1 | 0 | 1 | 5 | Bit Failure |
| 0 | 1 | 1 | 1 | 7 | No Effect / Undetectable |
| 1 | 0 | 0 | 1 | 9 | Bit Failure |
| 1 | 0 | 1 | 1 | 11 | No Effect / Undetectable |
| 1 | 1 | 0 | 1 | 13 | No Effect / Undetectable |
| 1 | 1 | 1 | 1 | 15 | RAM Nibble or Bit Failure |

FIG. 6

| | | SA0 | | Decimal | |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 0 | 0 | 0 | 0 | 0 | Nibble or Bit Failure |
| 0 | 1 | 0 | 0 | 4 | No Effect / Undetectable |
| 0 | 1 | 0 | 1 | 5 | Bit Failure |
| 1 | 0 | 0 | 0 | 8 | No Effect / Undetectable |
| 1 | 0 | 0 | 1 | 9 | Bit Failure |
| 1 | 1 | 0 | 1 | 13 | No Effect / Undetectable |
| 1 | 1 | 0 | 0 | 12 | Bit Failure |

FIG. 7

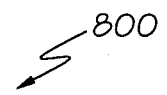

| | | SA1 | | Decimal | |
|---|---|---|---|---|---|
| Bit 3 | Bit 2 | Bit 1 | Bit 0 | Output | Error Diagnosis |
| 0 | 0 | 1 | 1 | 3 | Bit Failure |
| 0 | 0 | 1 | 0 | 2 | No Effect / Undetectable |
| 0 | 1 | 1 | 0 | 6 | Bit Failure |
| 0 | 1 | 1 | 1 | 7 | No Effect / Undetectable |
| 1 | 0 | 1 | 0 | 10 | Bit Failure |
| 1 | 0 | 1 | 1 | 11 | No Effect / Undetectable |
| 1 | 1 | 1 | 1 | 15 | RAM Nibble or Bit Failure |
| 1 | 1 | 1 | 0 | 14 | No Effect / Undetectable |

FIG. 8

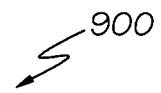

| | SA0 | | | Decimal | |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 0 | 0 | 1 | 0 | 2 | No Effect / Undetectable |
| 0 | 0 | 0 | 0 | 0 | RAM Nibble or Bit Failure |
| 0 | 0 | 1 | 1 | 3 | Bit Failure |
| 1 | 0 | 0 | 0 | 8 | No Effect / Undetectable |
| 1 | 0 | 1 | 1 | 11 | No Effect / Undetectable |
| 1 | 0 | 0 | 1 | 9 | Bit Failure |
| 1 | 0 | 1 | 0 | 10 | Bit Failure |

FIG. 9

| | SA1 | | | Decimal | |
|---|---|---|---|---|---|
| Bit 3 | Bit 2 | Bit 1 | Bit 0 | Output | Error Diagnosis |
| 0 | 1 | 0 | 1 | 5 | Bit Failure |
| 0 | 1 | 1 | 0 | 6 | Bit Failure |
| 0 | 1 | 0 | 0 | 4 | No Effect / Undetectable |
| 0 | 1 | 1 | 1 | 7 | No Effect / Undetectable |
| 1 | 1 | 0 | 0 | 12 | Bit Failure |
| 1 | 1 | 1 | 1 | 15 | RAM Nibble or Bit Failure |
| 1 | 1 | 0 | 1 | 13 | No Effect / Undetectable |
| 1 | 1 | 1 | 0 | 14 | No Effect / Undetectable |

FIG. 10

| SA0 | | | | Decimal | |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 0 | 0 | 1 | 0 | 2 | No Effect / Undetectable |
| 0 | 1 | 0 | 0 | 4 | No Effect / Undetectable |
| 0 | 1 | 1 | 1 | 7 | No Effect / Undetectable |
| 0 | 0 | 0 | 0 | 0 | RAM Nibble or Bit Failure |
| 0 | 0 | 1 | 1 | 3 | Bit Failure |
| 0 | 1 | 0 | 1 | 5 | Bit Failure |
| 0 | 1 | 1 | 0 | 6 | Bit Failure |

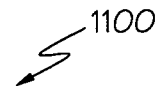

FIG. 11

| SA1 | | | | Decimal | |
|---|---|---|---|---|---|
| Bit 3 | Bit 2 | Bit 1 | Bit 0 | Output | Error Diagnosis |
| 1 | 0 | 0 | 1 | 9 | Bit Failure |
| 1 | 0 | 1 | 0 | 10 | Bit Failure |
| 1 | 1 | 0 | 0 | 12 | Bit Failure |
| 1 | 1 | 1 | 1 | 15 | RAM Nibble or Bit Failure |
| 1 | 0 | 0 | 0 | 8 | No Effect / Undetectable |
| 1 | 0 | 1 | 1 | 11 | No Effect / Undetectable |
| 1 | 1 | 0 | 1 | 13 | No Effect / Undetectable |
| 1 | 1 | 1 | 0 | 14 | No Effect / Undetectable |

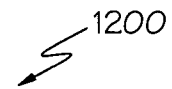

FIG. 12

| Normal Counter Values | | | | Decimal |
|---|---|---|---|---|
| Bit 3 | Bit 2 | Bit 1 | Bit 0 | Output |
| 0 | 0 | 0 | 1 | 1 |
| 0 | 0 | 1 | 0 | 2 |
| 0 | 1 | 1 | 1 | 7 |
| 0 | 1 | 0 | 0 | 4 |
| 1 | 1 | 0 | 1 | 13 |
| 1 | 1 | 1 | 0 | 14 |
| 1 | 0 | 1 | 1 | 11 |
| 1 | 0 | 0 | 0 | 8 |

FIG. 13

| | | | SA0 | Decimal | |
|---|---|---|---|---|---|
| Bit 3 | Bit 2 | Bit 1 | Bit 0 | Output | Error Diagnosis |
| 0 | 0 | 0 | 0 | 0 | Bit Failure |
| 0 | 0 | 1 | 0 | 2 | No Effect / Undetectable |
| 0 | 1 | 1 | 0 | 6 | Bit Failure |
| 0 | 1 | 0 | 0 | 4 | No Effect / Undetectable |
| 1 | 1 | 0 | 0 | 12 | Bit Failure |
| 1 | 1 | 1 | 0 | 14 | No Effect / Undetectable |
| 1 | 0 | 1 | 0 | 10 | Bit Failure |
| 1 | 0 | 0 | 0 | 8 | No Effect / Undetectable |

FIG. 14

| | | | SA1 | Decimal | |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 0 | 0 | 1 | 1 | 3 | Bit Failure |
| 0 | 1 | 1 | 1 | 7 | No Effect / Undetectable |
| 0 | 1 | 0 | 1 | 5 | Bit Failure |
| 1 | 1 | 0 | 1 | 13 | No Effect / Undetectable |
| 1 | 1 | 1 | 1 | 15 | RAM Nibble or Bit Failure |
| 1 | 0 | 1 | 1 | 11 | No Effect / Undetectable |
| 1 | 0 | 0 | 1 | 9 | Bit Failure |

FIG. 15

|  |  | SA0 |  | Decimal |  |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 0 | 0 | 0 | 0 | 0 | RAM Nibble or Bit Failure |
| 0 | 1 | 0 | 1 | 5 | Bit Failure |
| 0 | 1 | 0 | 0 | 4 | No Effect / Undetectable |
| 1 | 1 | 0 | 1 | 13 | No Effect / Undetectable |
| 1 | 1 | 0 | 0 | 12 | Bit Failure |
| 1 | 0 | 0 | 1 | 9 | No Effect / Undetectable |
| 1 | 0 | 0 | 0 | 8 | Bit Failure |

FIG. 16

|  |  | SA1 |  | Decimal |  |
|---|---|---|---|---|---|
| Bit 3 | Bit 2 | Bit 1 | Bit 0 | Output | Error Diagnosis |
| 0 | 0 | 1 | 1 | 3 | Bit Failure |
| 0 | 0 | 1 | 0 | 2 | No Effect / Undetectable |
| 0 | 1 | 1 | 1 | 7 | No Effect / Undetectable |
| 0 | 1 | 1 | 0 | 6 | Bit Failure |
| 1 | 1 | 1 | 1 | 15 | RAM Nibble or Bit Failure |
| 1 | 1 | 1 | 0 | 14 | No Effect / Undetectable |
| 1 | 0 | 1 | 1 | 11 | No Effect / Undetectable |
| 1 | 0 | 1 | 0 | 10 | Bit Failure |

FIG. 17

| SA0 | | | | Decimal | |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 0 | 0 | 1 | 0 | 2 | No Effect / Undetectable |
| 0 | 1 | 1 | 1 | 7 | No Effect / Undetectable |
| 0 | 1 | 0 | 0 | 4 | No Effect / Undetectable |
| 0 | 1 | 0 | 1 | 5 | Bit Failure |
| 0 | 1 | 1 | 0 | 6 | Bit Failure |
| 0 | 0 | 1 | 1 | 3 | Bit Failure |
| 0 | 0 | 0 | 0 | 0 | RAM Nibble or Bit Failure |

FIG. 20

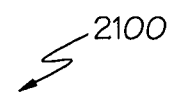

| SA1 | | | | Decimal | |
|---|---|---|---|---|---|
| Bit 3 | Bit 2 | Bit 1 | Bit 0 | Output | Error Diagnosis |
| 1 | 0 | 0 | 1 | 9 | Bit Failure |
| 1 | 0 | 1 | 0 | 10 | Bit Failure |
| 1 | 1 | 1 | 1 | 15 | RAM Nibble or Bit Failure |
| 1 | 1 | 0 | 0 | 12 | Bit Failure |
| 1 | 1 | 0 | 1 | 13 | No Effect / Undetectable |
| 1 | 1 | 1 | 0 | 14 | No Effect / Undetectable |
| 1 | 0 | 1 | 1 | 11 | No Effect / Undetectable |
| 1 | 0 | 0 | 0 | 8 | No Effect / Undetectable |

FIG. 21

| Normal Counter Values | | | | Decimal Output |
|---|---|---|---|---|
| Bit 3 | Bit 2 | Bit 1 | Bit 0 | |
| 0 | 0 | 0 | 1 | 1 |
| 1 | 1 | 0 | 1 | 13 |
| 0 | 1 | 0 | 0 | 4 |
| 1 | 1 | 1 | 0 | 14 |
| 1 | 0 | 0 | 0 | 8 |
| 1 | 0 | 1 | 1 | 11 |
| 0 | 0 | 1 | 0 | 2 |
| 0 | 1 | 1 | 1 | 7 |

FIG. 22

| | | | SA0 | Decimal Output | Error Diagnosis |
|---|---|---|---|---|---|
| Bit 3 | Bit 2 | Bit 1 | Bit 0 | | |
| 0 | 0 | 0 | 0 | 0 | RAM Nibble or Bit Failure |
| 1 | 1 | 0 | 0 | 12 | Bit Failure |
| 0 | 1 | 0 | 0 | 4 | No Effect / Undetectable |
| 1 | 1 | 1 | 0 | 14 | No Effect / Undetectable |
| 1 | 0 | 0 | 0 | 8 | No Effect / Undetectable |
| 1 | 0 | 1 | 0 | 10 | Bit Failure |
| 0 | 0 | 1 | 0 | 2 | No Effect / Undetectable |
| 0 | 1 | 1 | 0 | 6 | Bit Failure |

FIG. 23

| | | | SA1 | Decimal Output | Error Diagnosis |
|---|---|---|---|---|---|
| Bit 3 | Bit 2 | Bit 1 | Bit 0 | | |
| 0 | 0 | 0 | 1 | 1 | No Effect / Undetectable |
| 1 | 1 | 0 | 1 | 13 | No Effect / Undetectable |
| 0 | 1 | 0 | 1 | 5 | Bit Failure |
| 1 | 1 | 1 | 1 | 15 | RAM Nibble or Bit Failure |
| 1 | 0 | 0 | 1 | 9 | Bit Failure |
| 1 | 0 | 1 | 1 | 11 | No Effect / Undetectable |
| 0 | 0 | 1 | 1 | 3 | Bit Failure |
| 0 | 1 | 1 | 1 | 7 | No Effect / Undetectable |

FIG. 24

| | | SA0 | | Decimal | |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 1 | 1 | 0 | 1 | 13 | No Effect / Undetectable |
| 0 | 1 | 0 | 0 | 4 | No Effect / Undetectable |
| 1 | 1 | 0 | 0 | 12 | Bit Failure |
| 1 | 0 | 0 | 0 | 8 | No Effect / Undetectable |
| 1 | 0 | 0 | 1 | 9 | Bit Failure |
| 0 | 0 | 0 | 0 | 0 | RAM Nibble or Bit Failure |
| 0 | 1 | 0 | 1 | 5 | Bit Failure |

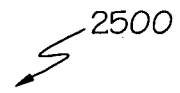

FIG. 25

| | | SA1 | | Decimal | |
|---|---|---|---|---|---|
| Bit 3 | Bit 2 | Bit 1 | Bit 0 | Output | Error Diagnosis |
| 0 | 0 | 1 | 1 | 3 | Bit Failure |
| 1 | 1 | 1 | 1 | 15 | RAM Nibble or Bit Failure |
| 0 | 1 | 1 | 0 | 6 | Bit Failure |
| 1 | 1 | 1 | 0 | 14 | No Effect / Undetectable |
| 1 | 0 | 1 | 0 | 10 | Bit Failure |
| 1 | 0 | 1 | 1 | 11 | No Effect / Undetectable |
| 0 | 0 | 1 | 0 | 2 | No Effect / Undetectable |
| 0 | 1 | 1 | 1 | 7 | No Effect / Undetectable |

FIG. 26

| | SA0 | | | Decimal | |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 1 | 0 | 0 | 1 | 9 | Bit Failure |
| 0 | 0 | 0 | 0 | 0 | RAM Nibble or Bit Failure |
| 1 | 0 | 1 | 0 | 10 | Bit Failure |
| 1 | 0 | 0 | 0 | 8 | No Effect / Undetectable |
| 1 | 0 | 1 | 1 | 11 | No Effect / Undetectable |
| 0 | 0 | 1 | 0 | 2 | No Effect / Undetectable |
| 0 | 0 | 1 | 1 | 3 | Bit Failure |

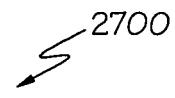

FIG. 27

| | SA1 | | | Decimal | |
|---|---|---|---|---|---|
| Bit 3 | Bit 2 | Bit 1 | Bit 0 | Output | Error Diagnosis |
| 0 | 1 | 0 | 1 | 5 | Bit Failure |
| 1 | 1 | 0 | 1 | 13 | No Effect / Undetectable |
| 0 | 1 | 0 | 0 | 4 | No Effect / Undetectable |
| 1 | 1 | 1 | 0 | 14 | No Effect / Undetectable |
| 1 | 1 | 0 | 0 | 12 | Bit Failure |
| 1 | 1 | 1 | 1 | 15 | RAM Nibble or Bit Failure |
| 0 | 1 | 1 | 0 | 6 | Bit Failure |
| 0 | 1 | 1 | 1 | 7 | No Effect / Undetectable |

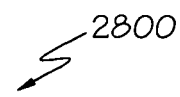

FIG. 28

| SA0 | | | | Decimal | |
|---|---|---|---|---|---|
| Bit 3 | Bit 2 | Bit 1 | Bit 0 | Output | Error Diagnosis |
| 0 | 0 | 0 | 1 | 1 | No Effect / Undetectable |
| 0 | 1 | 0 | 1 | 5 | Bit Failure |
| 0 | 1 | 0 | 0 | 4 | No Effect / Undetectable |
| 0 | 1 | 1 | 0 | 6 | Bit Failure |
| 0 | 0 | 0 | 0 | 0 | RAM Nibble or Bit Failure |
| 0 | 0 | 1 | 1 | 3 | Bit Failure |
| 0 | 0 | 1 | 0 | 2 | No Effect / Undetectable |
| 0 | 1 | 1 | 1 | 7 | No Effect / Undetectable |

FIG. 29

| SA1 | | | | Decimal | |
|---|---|---|---|---|---|
| Bit 3 | Bit 2 | Bit 1 | Bit 0 | Output | Error Diagnosis |
| 1 | 0 | 0 | 1 | 9 | Bit Failure |
| 1 | 1 | 0 | 1 | 13 | No Effect / Undetectable |
| 1 | 1 | 0 | 0 | 12 | Bit Failure |
| 1 | 1 | 1 | 0 | 14 | No Effect / Undetectable |
| 1 | 0 | 0 | 0 | 8 | No Effect / Undetectable |
| 1 | 0 | 1 | 1 | 11 | No Effect / Undetectable |
| 1 | 0 | 1 | 0 | 10 | Bit Failure |
| 1 | 1 | 1 | 1 | 15 | RAM Nibble or Bit Failure |

FIG. 30

METHODS AND SYSTEMS FOR SECURING VEHICLE DATA

TECHNICAL FIELD

The present invention generally relates to vehicles, and more particularly relates to methods and systems for securing data in vehicles.

BACKGROUND OF THE INVENTION

In today's vehicles, data messages are often encoded by computer systems or processors before they are transmitted between vehicle modules along a vehicle bus to protect against memory fault errors. For example, an initial checksum may be calculated for the data message before it is transmitted. The initial checksum may then be transmitted along with the data message and then compared with a subsequent checksum that is calculated after the data message and the initial checksum are transmitted along the vehicle bus. If the checksums do not match, then appropriate remedial action may be taken.

For additional protection against memory fault errors, each data message may include an identifier that is encoded. Typically such data message identifiers use two binary digits (bits), and are encoded using an additional two bits, for example by calculating a one's complement of the data message identifier and transmitting the one's complement along with the data message along the vehicle bus for subsequent comparison with the data message identifier. However, such encoding techniques, such as using a one's complement of an identifier for a data message, may not always provide optimal protection against memory fault errors.

Accordingly, it is desirable to provide an improved method for securing data in vehicles. It is also desired to provide an improved program product for securing data in vehicles. It is further desirable to provide an improved system for securing data in vehicles. Furthermore, other desirable features and characteristics of the present invention will become apparent from the subsequent detailed description of the invention and the appended claims, taken in conjunction with the accompanying drawings and this background of the invention.

SUMMARY OF THE INVENTION

In accordance with an exemplary embodiment of the present invention, a method for securing vehicle data comprising a plurality of data messages is provided. The method comprises the steps of determining a sequence for the plurality of data messages, selecting a plurality of identifier values for the plurality of data messages such that each of the plurality of identifier values are at least two bit errors removed from another, and assigning one of the plurality of identifier values to each of the plurality of data messages, based at least in part on the sequence.

In accordance with another exemplary embodiment of the present invention, a program product for securing vehicle data comprising a plurality of data messages is provided. The program product comprises a program and a computer-readable signal bearing media bearing the program. The program is configured to at least facilitate determining a sequence for the plurality of data messages, selecting a plurality of identifier values for the plurality of data messages such that each of the plurality of identifier values are at least two bit errors removed from another, and assigning one of the plurality of identifier values to each of the plurality of data messages, based at least in part on the sequence. The computer-readable signal bearing media bears the program.

In accordance with a further exemplary embodiment of the present invention, a communications system for securing data comprising a plurality of data messages pertaining to a vehicle is provided. The communications system comprises a transmitter module comprising an interface and a processor. The interface is configured to at least facilitate obtaining the plurality of data messages. The processor is coupled to the interface, and is configured to at least facilitate determining a sequence for the plurality of data messages, selecting a plurality of identifier values for the plurality of data messages such that each of the plurality of identifier values are at least two bit errors removed from another, and assigning one of the plurality of identifier values to each of the plurality of data messages, based at least in part on the sequence.

BRIEF DESCRIPTION OF THE DRAWINGS

The present invention will hereinafter be described in conjunction with the following drawing figures, wherein like numerals denote like elements, and wherein:

FIG. 4 depicts a table featuring an ordered rolling count sequence that can be used for assigning identifiers for data messages generated by the communications process of FIG. 3, and that can be generated using the communications system of FIG. 1 and/or the computer system of FIG. 2, in accordance with an exemplary embodiment of the present invention;

FIG. 5 depicts a table illustrating changes of the ordered rolling count sequence of FIG. 4 in the event of a first type of memory fault error, in which a zero level binary digit (bit) is stuck at a value equal to zero, in accordance with an exemplary embodiment of the present invention;

FIG. 6 depicts a table illustrating changes of the ordered rolling count sequence of FIG. 4 in the event of a second type of memory fault error, in which a zero level bit is stuck at a value equal to one, in accordance with an exemplary embodiment of the present invention;

FIG. 7 depicts a table illustrating changes of the ordered rolling count sequence of FIG. 4 in the event of a third type of memory fault error, in which a first level bit is stuck at a value equal to zero, in accordance with an exemplary embodiment of the present invention;

FIG. 8 depicts a table illustrating changes of the ordered rolling count sequence of FIG. 4 in the event of a fourth type of memory fault error, in which a first level bit is stuck at a value equal to one, in accordance with an exemplary embodiment of the present invention;

FIG. 9 depicts a table illustrating changes of the ordered rolling count sequence of FIG. 4 in the event of a fifth type of memory fault error, in which a second level bit is stuck at a value equal to zero, in accordance with an exemplary embodiment of the present invention;

FIG. 10 depicts a table illustrating changes of the ordered rolling count sequence of FIG. 4 in the event of a sixth type of memory fault error, in which a second level bit is stuck at a value equal to one, in accordance with an exemplary embodiment of the present invention;

FIG. 11 depicts a table illustrating changes of the ordered rolling count sequence of FIG. 4 in the event of a seventh type of memory fault error, in which a third level bit is stuck at a value equal to zero, in accordance with an exemplary embodiment of the present invention;

FIG. 12 depicts a table illustrating changes of the ordered rolling count sequence of FIG. 4 in the event of an eighth type of memory fault error, in which a third level bit is stuck at a value equal to one, in accordance with an exemplary embodiment of the present invention;

FIG. 13 depicts a table featuring an alternative ordered rolling count sequence that can be used for assigning identifiers for data messages generated by the communications process of FIG. 3, and that can be generated using the communications system of FIG. 1 and/or the computer system of FIG. 2, in accordance with an exemplary embodiment of the present invention;

FIG. 14 depicts a table illustrating changes of the ordered rolling count sequence of FIG. 13 in the event of a first type of memory fault error, in which a zero level bit is stuck at a value equal to zero, in accordance with an exemplary embodiment of the present invention;

FIG. 15 depicts a table illustrating changes of the ordered rolling count sequence of FIG. 13 in the event of a second type of memory fault error, in which a zero level bit is stuck at a value equal to one, in accordance with an exemplary embodiment of the present invention;

FIG. 16 depicts a table illustrating changes of the ordered rolling count sequence of FIG. 13 in the event of a third type of memory fault error, in which a first level bit is stuck at a value equal to zero, in accordance with an exemplary embodiment of the present invention;

FIG. 17 depicts a table illustrating changes of the ordered rolling count sequence of FIG. 13 in the event of a fourth type of memory fault error, in which a first level bit is stuck at a value equal to one, in accordance with an exemplary embodiment of the present invention;

FIG. 20 depicts a table illustrating changes of the ordered rolling count sequence of FIG. 13 in the event of a seventh type of memory fault error, in which a third level bit is stuck at a value equal to zero, in accordance with an exemplary embodiment of the present invention;

FIG. 21 depicts a table illustrating changes of the ordered rolling count sequence of FIG. 13 in the event of an eighth type of memory fault error, in which a third level bit is stuck at a value equal to one, in accordance with an exemplary embodiment of the present invention;

FIG. 22 depicts a table featuring another alternative ordered rolling count sequence that can be used for assigning identifiers for data messages generated by the communications process of FIG. 3, and that can be generated using the communications system of FIG. 1 and/or the computer system of FIG. 2, in accordance with an exemplary embodiment of the present invention;

FIG. 23 depicts a table illustrating changes of the ordered rolling count sequence of FIG. 22 in the event of a first type of memory fault error, in which a zero level bit is stuck at a value equal to zero, in accordance with an exemplary embodiment of the present invention;

FIG. 24 depicts a table illustrating changes of the ordered rolling count sequence of FIG. 22 in the event of a second type of memory fault error, in which a zero level bit is stuck at a value equal to one, in accordance with an exemplary embodiment of the present invention;

FIG. 25 depicts a table illustrating changes of the ordered rolling count sequence of FIG. 22 in the event of a third type of memory fault error, in which a first level bit is stuck at a value equal to zero, in accordance with an exemplary embodiment of the present invention;

FIG. 26 depicts a table illustrating changes of the ordered rolling count sequence of FIG. 22 in the event of a fourth type of memory fault error, in which a first level bit is stuck at a value equal to one, in accordance with an exemplary embodiment of the present invention;

FIG. 27 depicts a table illustrating changes of the ordered rolling count sequence of FIG. 22 in the event of a fifth type of memory fault error, in which a second level bit is stuck at a value equal to zero, in accordance with an exemplary embodiment of the present invention;

FIG. 28 depicts a table illustrating changes of the ordered rolling count sequence of FIG. 22 in the event of a sixth type of memory fault error, in which a second level bit is stuck at a value equal to one, in accordance with an exemplary embodiment of the present invention;

FIG. 29 depicts a table illustrating changes of the ordered rolling count sequence of FIG. 22 in the event of a seventh type of memory fault error, in which a third level bit is stuck at a value equal to zero, in accordance with an exemplary embodiment of the present invention;

FIG. 30 depicts a table illustrating changes of the ordered rolling count sequence of FIG. 22 in the event of an eighth type of memory fault error, in which a third level bit is stuck at a value equal to one, in accordance with an exemplary embodiment of the present invention.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
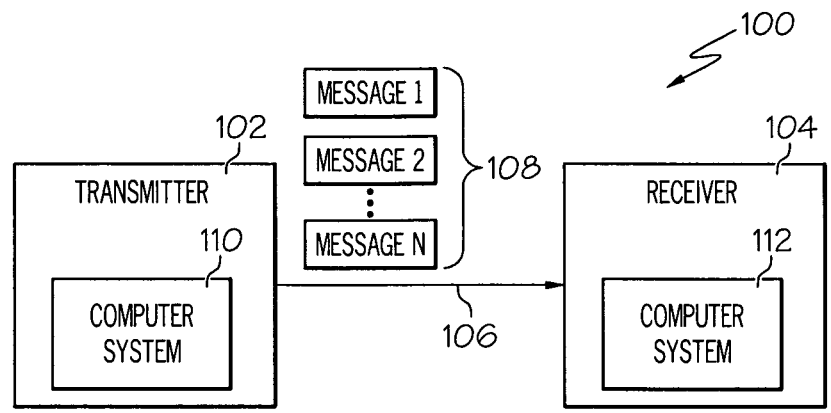
FIG. 1 is a functional block diagram of a communications system in a vehicle for processing data in the vehicle, in accordance with an exemplary embodiment of the present invention.

FIG. 1 is a functional block diagram of a communications system 100 in a vehicle, in accordance with an exemplary embodiment of the present invention. In the depicted embodiment, the communications system 100 includes a transmitter 102 and a receiver 104. In a preferred embodiment, the transmitter 102 and the receiver 104 correspond to different, non-depicted modules (e.g., an engine control module (ECM), a braking module, a transmission control module, and/or various other vehicle modules) and/or computer systems between which data, commands and/or other information is transmitted. However, this may vary in other embodiments, for example in that data, commands, and/or other information may instead be transmitted within one or more computer systems and/or vehicle modules.

The transmitter 102 and the receiver 104 are coupled, and are preferably interconnected, by a conventional data connection 106 as appropriate. In various embodiments, the data connection 106 is a universal asynchronous receiver/transmitter (UART) or other internal connection (e.g. a bus connection) within the communications system 100. The transmitter 102 generates a plurality of encoded data messages 108 in the vehicle, and transports the encoded data messages 108 to the receiver across the data connection 106. The receiver 104 receives the encoded data messages 108, interprets the encoded data messages 108, and provides instructions as to any required remedial action based on the encoded data messages 108. An exemplary embodiment of a communications process for processing, encoding, transmitting, receiving, and implementing the data messages 108 will be discussed further below in connection with FIG. 3.

As depicted in FIG. 1, the transmitter 102 and the receiver 104 preferably include respective first and second computer systems 110, 112. In the depicted embodiment, the first and second computer systems 110, 112 are part of the transmitter 102 and the receiver 104, respectively. In other embodiments, the first and second computer systems 110, 112 may be coupled to the transmitter 102 and the receiver 104, respectively. An exemplary embodiment of a computer system, which can be used for the first and second computer systems 110 and 112 for the transmitter 102 and the receiver 104, respectively, will be discussed below in connection with FIG. 2. In a preferred embodiment, the transmitter 102 and the receiver 104 use different computer systems 110, 112. However, it will be appreciated that, in various other embodiments, the transmitter 102 and the receiver 104 may use one or more common computer systems. It will similarly be appreciated that the communications system 100 can be utilized in connection with any number of different types of computer systems and/or other devices or systems in various embodiments.

Figure 2:
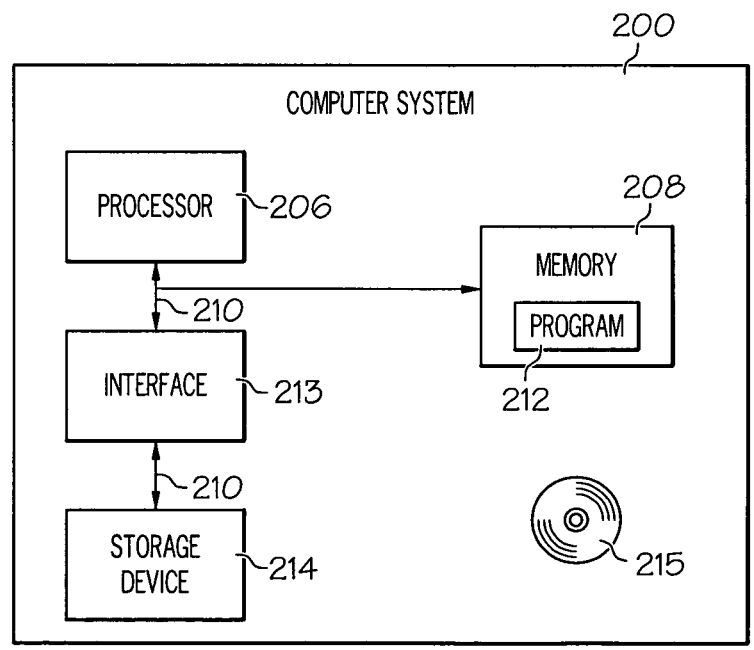
FIG. 2 is a functional block diagram of a computer system that can be utilized in connection with the communications system of FIG. 1, in accordance with an exemplary embodiment of the present invention.

FIG. 2 is a functional block diagram of a computer system 200 that can be used in connection with the above-referenced respective first and second computer systems 110, 112 of the transmitter 102 and the receiver 104 of the communications system 100 of FIG. 1, and that can be utilized in implementing the communications process described further below in connection with FIG. 3 and other processes and steps described herein, in accordance with an exemplary embodiment of the present invention.

In the embodiment depicted in FIG. 2, each computer system 200 includes a processor 206, a memory 208, a computer bus 210, an interface 213, and a storage device 214. The processor 206 performs the computation and control functions of the transmitter 102 and/or the receiver 104 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 206 executes one or more programs 212 preferably stored within the memory 208 and, as such, controls the general operation of the computer system 200.

The memory 208 stores a program or programs 212 that executes one or more embodiments of a communications process such as that described further below in connection with FIG. 3, and/or various steps thereof and/or other processes, such as those described elsewhere herein. The memory 208 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 208 may be a single type of memory component, or it may be composed of many different types of memory components. In addition, the memory 208 and the processor 206 may be distributed across several different computers that collectively comprise the computer system 200. For example, a portion of the memory 208 may reside on a computer within a particular apparatus or process, and another portion may reside on a remote computer.

The computer bus 210 serves to transmit programs, data, status and other information or signals between the various components of the computer system 200. The computer bus 210 can be any suitable physical or logical means of connecting computer systems and components. This includes, but is not limited to, direct hard-wired connections, fiber optics, infrared and wireless bus technologies.

The interface 213 allows communication to the computer system 200, for example from a system operator and/or another computer system, for example to the processor 206, and can be implemented using any suitable method and apparatus. It can include one or more network interfaces to communicate within the communications system 100 of FIG. 1 and/or within or to other systems or components, one or more terminal interfaces to communicate with technicians, and one or more storage interfaces to connect to storage apparatuses such as the storage device 214.

The storage device 214 can be any suitable type of storage apparatus, including direct access storage devices such as hard disk drives, flash systems, floppy disk drives and optical disk drives. In one exemplary embodiment, the storage device 214 is a program product from which memory 208 can receive a program 212 that executes one or more embodiments of a communications process of the present invention, and/or steps thereof. In one preferred embodiment, such a program product can be implemented as part of, inserted into, or otherwise coupled to the first and second computer systems 110, 112 of the transmitter 102 and the receiver 104, respectively, of the communications system 100 of FIG. 1. As shown in FIG. 2, the storage device 214 can comprise a disk drive device that uses disks 215 to store data. As one exemplary implementation, the computer system 200 may also utilize an Internet website, for example for providing or maintaining data or performing operations thereon.

It will be appreciated that while this exemplary embodiment is described in the context of a fully functioning computer system, the mechanisms of the present invention are capable of being distributed as a program product in a variety of forms, and without regard to the particular type of computer-readable signal bearing media used to carry out the distribution. Examples of signal bearing media include: recordable media such as floppy disks, hard drives, memory cards and optical disks (e.g., disk 215), and transmission media such as digital and analog communication links. It will similarly be appreciated that the computer system 200 may also otherwise differ from the embodiment depicted in FIG. 2, for example in that the computer system 200 may be coupled to or may otherwise utilize one or more remote computer systems and/or other control systems.

Figure 3:
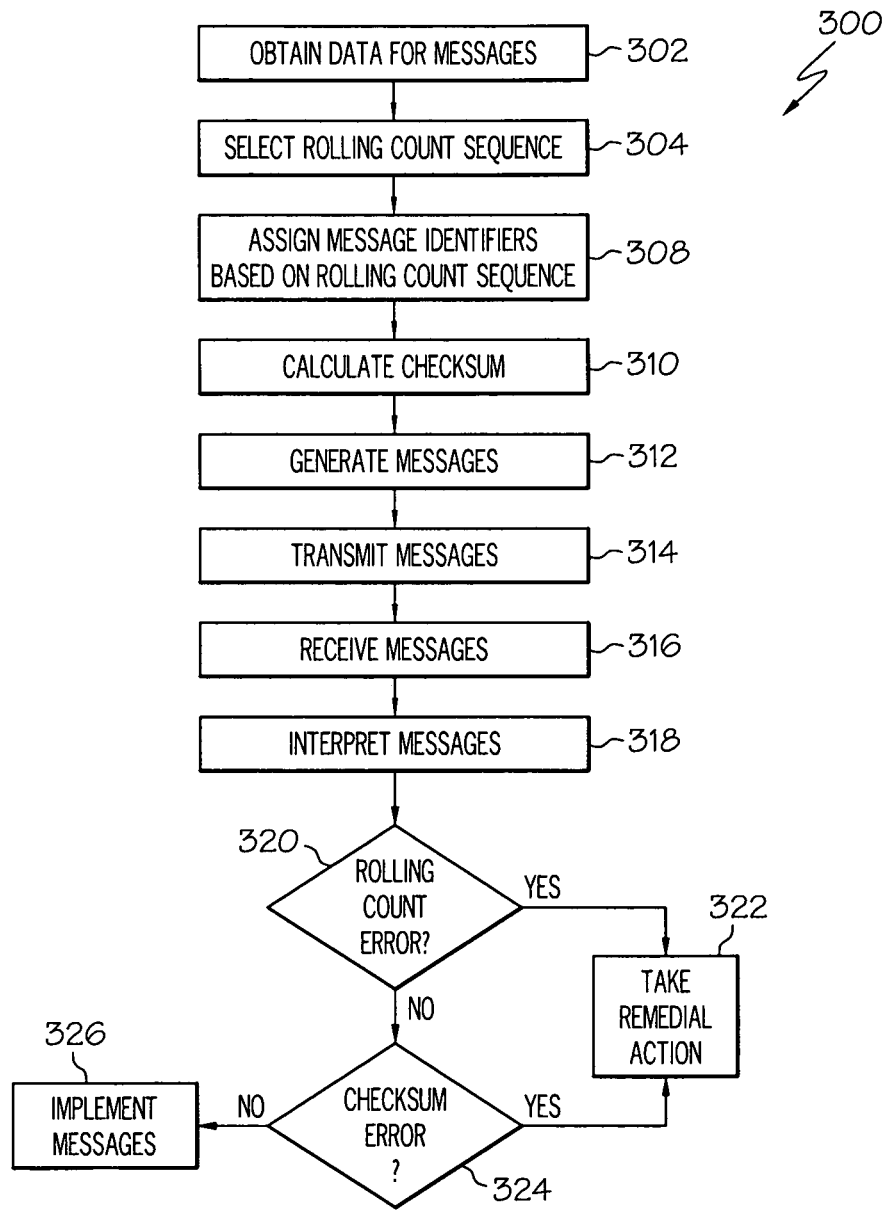
FIG. 3 is a flowchart depicting a communications process for processing data in a vehicle, for example that can be used in connection with the communications system of FIG. 1 and the computer system of FIG. 2, in accordance with an exemplary embodiment of the present invention.

FIG. 3 is a flowchart depicting a communications process 300 for processing, encoding, transmitting, receiving, and implementing data messages, such as the data messages 108 of FIG. 1, in accordance with an exemplary embodiment of the present invention. In a preferred embodiment, the communications process 300 can be utilized in connection with the communications system 100 of FIG. 1 and the computer system 200 of FIG. 2. However, it will be appreciated that the communications process 300 can also be utilized in connection with any number of other different types of systems and/or devices.

As depicted in FIG. 3, the communications process 300 begins with the step of obtaining data for data messages (step 302). In a preferred embodiment, the data is obtained by a computer system, such as the computer system 200 of FIG. 2 and/or the first computer system 110 of the transmitter 102 of FIG. 1, from one or more non-depicted sensors, other computer systems, vehicle modules, and/or other sources. Also in a preferred embodiment, the data is obtained by an interface for such a computer system, such as the interface 213 of FIG. 2. Preferably, data is obtained at various time intervals, and most preferably continuously, for inclusion in one or more sequences of data messages, such as the plurality of data messages 108 depicted in FIG. 1.

In addition, values for a rolling count sequence are selected (step 304). As described in greater detail further below, the values for the rolling count sequence are used to assign identifier values for each of the data messages in a manner that assists in controlling for memory fault errors in the transmission of the data messages.

In one preferred embodiment, the values for the rolling count sequence are selected by a computer system, such as the computer system 200 of FIG. 2 and/or the first computer system 110 of the transmitter 102 of FIG. 1, preferably by a processor thereof, such as the processor 206 depicted in FIG. 2. Also in a preferred embodiment, the values for the rolling count sequence are retrieved from a memory of such a computer system, such as the memory 208 depicted in FIG. 2. However, this may vary in other embodiments.

Each of the values for the rolling count sequence is at least two bit errors removed from another. In addition, preferably each of the values for the rolling count sequence can be expressed with a predetermined number of binary digits (bits). For example, in one preferred embodiment in which each data message has a four-bit identifier value, each value of the rolling count sequence can be expressed with four bits, and each such value when expressed in binary form is at least two bits removed from one another.

In one such preferred embodiment involving four bit values, the values for the rolling count sequence include the values one (0001 in binary form), two (0010 in binary form), four (0100 in binary form), seven (0111 in binary form), eight (1000 in binary form), eleven (1011 in binary form), thirteen (1101 in binary form), and fourteen (1110 in binary form). In an alternate preferred embodiment involving four bit values, the values of the rolling count include the values zero (0000 in binary form), three (0011 in binary form), five (0101 in binary form), six (0110 in binary form), nine (1001 in binary form), ten (1010 in binary form), twelve (1100 in binary form), and fifteen (1111 in binary form). The values for the rolling count sequence may vary, as may the number of binary digits through which each value is represented and/or the total number of values in the rolling count sequence. In addition, as described directly below, the order of the values in a particular rolling count sequence may also vary.

Message identifiers are assigned for each of the data messages based on the values of the rolling count sequence (step 308). For example, in one preferred embodiment, the identifier for each data message comprises a binary representation of one of the values of the rolling count sequence. Also in a preferred embodiment, the assignment of the different values of the rolling count sequence as identifiers for the data messages is based upon an order of the rolling count sequence and an order of the data messages. Preferably the identifiers for the data messages are assigned by a computer system, such as the computer system 200 of FIG. 2 and/or the first computer system 110 of the transmitter 102 of FIG. 1, preferably by a processor thereof, such as the processor 206 depicted in FIG. 2.

In one preferred embodiment, the values for the rolling count sequence are ordered based on a decimal value in decimal form for each of the values for the rolling count sequence, and the values are assigned to the data messages in order of such decimal values. For example, in one such embodiment in which the values for the rolling count sequence include the values one (0001 in binary form), two (0010 in binary form), four (0100 in binary form), seven (0111 in binary form), eight (1000 in binary form), eleven (1011 in binary form), thirteen (1101 in binary form), and fourteen (1110 in binary form), the rolling count sequence is ordered with the first value being one (0001 in binary form), the second value being two (0010 in binary form), the third value being four (0100 in binary form), the fourth value being seven (0111 in binary form), the fifth value being eight (1000 in binary form), the sixth value being eleven (1011 in binary form), the seventh value being thirteen (1101 in binary form), and the eighth value being fourteen (1110 in binary form).

Accordingly, in such an embodiment, the first data message is assigned an identifier of 0001 in binary form (representing the decimal value one), the second data message is assigned an identifier of 0010 in binary form (representing the decimal value two), the third data message is assigned an identifier of 0100 in binary form (representing the decimal value four), the fourth data message is assigned an identifier of 0111 in binary form (representing the decimal value seven), the fifth data message is assigned an identifier of 1000 in binary form (representing the decimal value eight), the sixth data message is assigned an identifier of 1011 in binary form (representing the decimal value eleven), the seventh data message is assigned an identifier of 1101 in binary form (representing the decimal value thirteen), and the eighth data message is assigned an identifier of 1110 in binary form (representing the decimal value fourteen).

The assignment of identifiers then repeats with the same sequence for subsequent data messages. For example, in this embodiment, the ninth data message is assigned an identifier of 0001 in binary form (representing the decimal value one), the tenth data message is assigned an identifier of 0010 in binary form (representing the decimal value two), the eleventh data message is assigned an identifier of 0100 in binary form (representing the decimal value four), the twelfth data message is assigned an identifier of 0111 in binary form (representing the decimal value seven), the thirteenth data message is assigned an identifier of 1000 in binary form (representing the decimal value eight), the fourteenth data message is assigned an identifier of 1011 in binary form (representing the decimal value eleven), the fifteenth data message is assigned an identifier of 1101 in binary form (representing the decimal value thirteen), and the form), the sixteenth data message is assigned an identifier of 1110 in binary form (representing the decimal value fourteen), and so on.

Turning now to FIGS. 4-12, an effectiveness of such an ordered rolling count sequence based on decimal values will now be described. Specifically, FIG. 4 depicts a table 400 of the ordered rolling count sequence in this exemplary embodiment as used for assigning identifiers to the data messages, while FIGS. 5-12 depict changes to the ordered rolling count sequence, and hence corresponding changes to the identifiers assigned to the data messages, in the event of specific types of memory fault errors. As will be explained further below, such changes in the identifiers can be recognized after transmission of the data messages to indicate the presence of such memory fault errors so that appropriate remedial action may be taken.

FIG. 5 depicts a table 500 illustrating changes of the ordered rolling count sequence, and hence corresponding changes of the identifiers assigned to the data messages in the event of a zero level bit (labeled as Bit 0 in FIG. 5) being stuck at a value equal to zero in this exemplary embodiment. As shown in FIG. 5, in this exemplary embodiment, an error will be detected in four out of each eight data messages (namely, the first, fourth, sixth, and seventh data messages in each sequence of data messages). Also as shown in FIG. 5, a maximum of two data messages can be examined in sequence without detecting an error (for example, the second and third data messages in a sequence of data messages).

FIG. 6 depicts a table 600 illustrating changes of the ordered rolling count sequence, and hence corresponding changes of the identifiers assigned to the data messages in the event of a zero level bit (labeled as Bit 0 in FIG. 6) being stuck at a value equal to one in this exemplary embodiment. As shown in FIG. 6, in this exemplary embodiment, an error will be detected in four out of each eight data messages (namely, the second, third, fifth, and eighth data messages in each sequence of data messages). Also as shown in FIG. 6, a maximum of two data messages can be examined in sequence without detecting an error (for example, the sixth and seventh data messages in a sequence of data messages).

FIG. 7 depicts a table 700 illustrating changes of the ordered rolling count sequence, and hence corresponding changes of the identifiers assigned to the data messages in the event of a first level bit (labeled as Bit 1 in FIG. 7) being stuck at a value equal to zero in this exemplary embodiment. As shown in FIG. 7, in this exemplary embodiment, an error will be detected in four out of each eight data messages (namely, the second, fourth, sixth, and eighth data messages in each sequence of data messages). Also as shown in FIG. 7, a maximum of one data message in a sequence of data messages can be examined without detecting an error (for example, the first, third, fifth, or seventh data message in a sequence of data messages).

FIG. 8 depicts a table 800 illustrating changes of the ordered rolling count sequence, and hence corresponding changes of the identifiers assigned to the data messages in the event of a first level bit (labeled as Bit 1 in FIG. 8) being stuck at a value equal to one in this exemplary embodiment. As shown in FIG. 8, in this exemplary embodiment, an error will be detected in four out of each eight data messages (namely, the first, third, fifth, and seventh data messages in each sequence of data messages). Also as shown in FIG. 8, a maximum of one data message in a sequence of data messages can be examined without detecting an error (for example, the second, fourth, sixth, or eighth data message in a sequence of data message).

FIG. 9 depicts a table 900 illustrating changes of the ordered rolling count sequence, and hence corresponding changes of the identifiers assigned to the data messages in the event of a second level bit (labeled as Bit 2 in FIG. 9) being stuck at a value equal to zero in this exemplary embodiment. As shown in FIG. 9, in this exemplary embodiment, an error will be detected in four out of each eight data messages (namely, the third, fourth, seventh, and eighth data messages in each sequence of data messages). Also as shown in FIG. 9, a maximum of two data messages can be examined in sequence without detecting an error (for example, the first and second data messages or the fifth and sixth data messages in a sequence of data messages).

FIG. 10 depicts a table 1000 illustrating changes of the ordered rolling count sequence, and hence corresponding changes of the identifiers assigned to the data messages in the event of a second level bit (labeled as Bit 2 in FIG. 10) being stuck at a value equal to one in this exemplary embodiment. As shown in FIG. 10, in this exemplary embodiment, an error will be detected in four out of each eight data messages (namely, the first, second, fifth, and sixth data messages in each sequence of data messages). Also as shown in FIG. 10, a maximum of two data messages can be examined in sequence without detecting an error (for example, the third and fourth data messages or the seventh and eighth data messages in a sequence of data messages).

FIG. 11 depicts a table 1100 illustrating changes of the ordered rolling count sequence, and hence corresponding changes of the identifiers assigned to the data messages in the event of a third level bit (labeled as Bit 3 in FIG. 11) being stuck at a value equal to zero in this exemplary embodiment. As shown in FIG. 11, in this exemplary embodiment, an error will be detected in four out of each eight data messages (namely, the fifth, sixth, seventh, and eighth data messages in each sequence of data messages). Also as shown in FIG. 11, a maximum of four data messages can be examined in sequence without detecting an error (for example, the first, second, third, and fourth data messages in a sequence of data messages).

FIG. 12 depicts a table 1200 illustrating changes of the ordered rolling count sequence, and hence corresponding changes of the identifiers assigned to the data messages in the event of a third level bit (labeled as Bit 3 in FIG. 12) being stuck at a value equal to one in this exemplary embodiment. As shown in FIG. 12, in this exemplary embodiment, an error will be detected in four out of each eight data messages (namely, the first, second, third, and fourth data messages in each sequence of data messages). Also as shown in FIG. 12, a maximum of four data messages can be examined in sequence without detecting an error (for example, the fifth, sixth, seventh, and eighth data messages in a sequence of data messages).

Referring again to FIG. 3, in another preferred embodiment of steps 304 and 308, the values for the rolling count sequence are ordered based on a gray code representing an ordered sequence of binary digit changes to an initial value. For example, in one such embodiment in which the values for the rolling count sequence include the values one (0001 in binary form), two (0010 in binary form), four (0100 in binary form), seven (0111 in binary form), eight (1000 in binary form), eleven (1011 in binary form), thirteen (1101 in binary form), and fourteen (1110 in binary form), the rolling count sequence is ordered with the first value being one (0001 in binary form), the second value being two (0010 in binary form), the third value being seven (0111 in binary form), the fourth value being four (0100 in binary form), the fifth value being thirteen (1101 in binary form), the sixth value being fourteen (1110 in binary form), the seventh value being eleven (1011 in binary form), and the eighth value being eight (1000 in binary form).

Accordingly, in such an embodiment, the first data message is assigned an identifier of 0001 in binary form (representing the decimal value one), the second data message is assigned an identifier of 0010 in binary form (representing the decimal value two), the third data message is assigned an identifier of 0111 in binary form (representing the decimal value seven), the fourth data message is assigned an identifier of 0100 in binary form (representing the decimal value four), the fifth data message is assigned an identifier of 1101 in binary form (representing the decimal value thirteen), the sixth data message is assigned an identifier of 1110 in binary form (representing the decimal value fourteen), the seventh data message is assigned an identifier of 1011 in binary form (representing the decimal value eleven), and the eighth data message is assigned an identifier of 1000 in binary form (representing the decimal value eight).

The assignment of identifiers then repeats with the same sequence for subsequent data messages. For example, in this embodiment, the ninth data message is assigned an identifier of 0001 in binary form (representing the decimal value one), the tenth data message is assigned an identifier of 0010 in binary form (representing the decimal value two), the eleventh data message is assigned an identifier of 0111 in binary form (representing the decimal value seven), the twelfth data message is assigned an identifier of 0100 in binary form (representing the decimal value four), the thirteenth data message is assigned an identifier of 1101 in binary form (representing the decimal value thirteen), the fourteenth data message is assigned an identifier of 1110 in binary form (representing the decimal value fourteen), the fifteenth data message is assigned an identifier of 1011 in binary form (representing the decimal value eleven), and the sixteenth data message is assigned an identifier of 1000 in binary form (representing the decimal value eight), and so on.

Turning now to FIGS. 13-21, an effectiveness of such an ordered rolling count sequence based on decimal values will now be described. Specifically, FIG. 13 depicts a table 1300 of the ordered rolling count sequence in this exemplary embodiment as used for assigning identifiers to the data messages, while FIGS. 14-21 depict changes to the ordered rolling count sequence, and hence corresponding changes to the identifiers assigned to the data messages, in the event of specific types of memory fault errors. As will be explained further below, such changes in the identifiers can be recognized after transmission of the data messages to indicate the presence of such memory fault errors so that appropriate remedial action may be taken.

FIG. 14 depicts a table 1400 illustrating changes of the ordered rolling count sequence, and hence corresponding changes of the identifiers assigned to the data messages in the event of a zero level bit (labeled as Bit 0 in FIG. 14) being stuck at a value equal to zero in this exemplary embodiment. As shown in FIG. 14, in this exemplary embodiment, an error will be detected in four out of each eight data messages (namely, the first, third, fifth, and seventh data messages in each sequence of data messages). Also as shown in FIG. 14, a maximum of one data message in a sequence of data messages can be examined without detecting an error (for example, the second, fourth, sixth, or eighth data message in a sequence of data messages).

FIG. 15 depicts a table 1500 illustrating changes of the ordered rolling count sequence, and hence corresponding changes of the identifiers assigned to the data messages in the event of a zero level bit (labeled as Bit 0 in FIG. 15) being stuck at a value equal to one in this exemplary embodiment. As shown in FIG. 15, in this exemplary embodiment, an error will be detected in four out of each eight data messages (namely, the second, fourth, sixth, and eighth data messages in each sequence of data messages). Also as shown in FIG. 15, a maximum of one data message in a sequence of data messages can be examined without detecting an error (for example, the first, third, fifth, or seventh data message in a sequence of data messages).

FIG. 16 depicts a table 1600 illustrating changes of the ordered rolling count sequence, and hence corresponding changes of the identifiers assigned to the data messages in the event of a first level bit (labeled as Bit 1 in FIG. 16) being stuck at a value equal to zero in this exemplary embodiment. As shown in FIG. 16, in this exemplary embodiment, an error will be detected in four out of each eight data messages (namely, the second, third, sixth, and eighth data messages in each sequence of data messages). Also as shown in FIG. 16, a maximum of two data messages can be examined in sequence without detecting an error (for example, the fourth and fifth data messages in a sequence of data messages).

FIG. 17 depicts a table 1700 illustrating changes of the ordered rolling count sequence, and hence corresponding changes of the identifiers assigned to the data messages in the event of a first level bit (labeled as Bit 1 in FIG. 17) being stuck at a value equal to one in this exemplary embodiment. As shown in FIG. 17, in this exemplary embodiment, an error will be detected in four out of each eight data messages (namely, the first, fourth, fifth, and eighth data messages in each sequence of data messages). Also as shown in FIG. 17, a maximum of two data messages can be examined in sequence without detecting an error (for example, the second and third data messages or the sixth and seven data messages in a sequence of data message).

Figure 18:
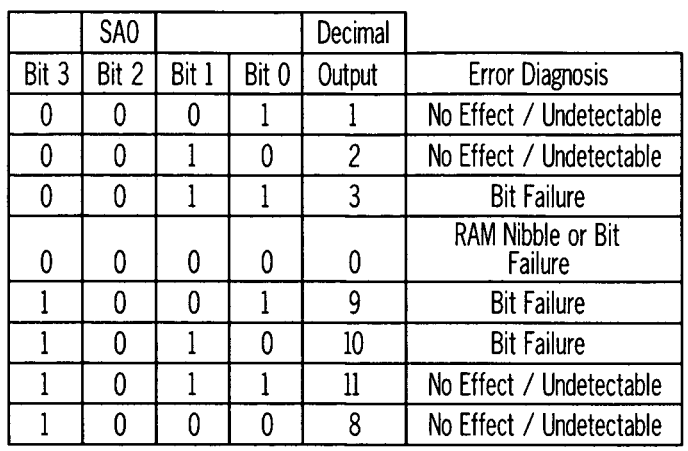
FIG. 18 depicts a table illustrating changes of the ordered rolling count sequence of FIG. 13 in the event of a fifth type of memory fault error, in which a second level bit is stuck at a value equal to zero, in accordance with an exemplary embodiment of the present invention.

FIG. 18 depicts a table 1800 illustrating changes of the ordered rolling count sequence, and hence corresponding changes of the identifiers assigned to the data messages in the event of a second level bit (labeled as Bit 2 in FIG. 18) being stuck at a value equal to zero in this exemplary embodiment. As shown in FIG. 18, in this exemplary embodiment, an error will be detected in four out of each eight data messages (namely, the third, fourth, fifth, and sixth data messages in each sequence of data messages). Also as shown in FIG. 18, a maximum of four data messages can be examined in sequence without detecting an error (for example, the seventh and eighth data messages of one sequence of data messages and the first and second data messages of an immediately subsequent sequence of data messages).

Figure 19:
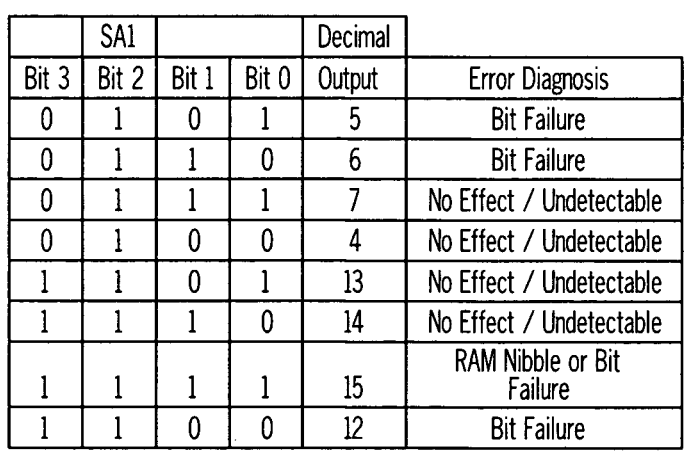
FIG. 19 depicts a table illustrating changes of the ordered rolling count sequence of FIG. 13 in the event of a sixth type of memory fault error, in which a second level bit is stuck at a value equal to one, in accordance with an exemplary embodiment of the present invention.

FIG. 19 depicts a table 1900 illustrating changes of the ordered rolling count sequence, and hence corresponding changes of the identifiers assigned to the data messages in the event of a second level bit (labeled as Bit 2 in FIG. 19) being stuck at a value equal to one in this exemplary embodiment. As shown in FIG. 19, in this exemplary embodiment, an error will be detected in four out of each eight data messages (namely, the first, second, seventh, and eighth data messages in each sequence of data messages). Also as shown in FIG. 19, a maximum of four data messages can be examined in sequence without detecting an error (for example, the third, fourth, fifth, and sixth data messages in a sequence of data messages).

FIG. 20 depicts a table 2000 illustrating changes of the ordered rolling count sequence, and hence corresponding changes of the identifiers assigned to the data messages in the event of a third level bit (labeled as Bit 3 in FIG. 20) being stuck at a value equal to zero in this exemplary embodiment. As shown in FIG. 20, in this exemplary embodiment, an error will be detected in four out of each eight data messages (namely, the fifth, sixth, seventh, and eighth data messages in each sequence of data messages). Also as shown in FIG. 20, a maximum of four data messages can be examined in sequence without detecting an error (for example, the first, second, third, and fourth data messages in a sequence of data messages).

FIG. 21 depicts a table 2100 illustrating changes of the ordered rolling count sequence, and hence corresponding changes of the identifiers assigned to the data messages in the event of a third level bit (labeled as Bit 3 in FIG. 21) being stuck at a value equal to one in this exemplary embodiment. As shown in FIG. 21, in this exemplary embodiment, an error will be detected in four out of each eight data messages (namely, the first, second, third, and fourth data messages in each sequence of data messages). Also as shown in FIG. 21, a maximum of four data messages can be examined in sequence without detecting an error (for example, the fifth, sixth, seventh, and eighth data messages in a sequence of data messages).

Referring again to FIG. 3, in yet another preferred embodiment of steps 304 and 308, the values for the rolling count sequence are ordered based on various pairs of complementary identifier values included with the rolling count sequence. Each pair of complementary identifier values comprises a first value and a second value that, in binary form, is a mirror image of the first value in binary form. For example, in the above-described example in which the values for the rolling count sequence include the values one (0001 in binary form), two (0010 in binary form), four (0100 in binary form), seven (0111 in binary form), eight (1000 in binary form), eleven (1011 in binary form), thirteen (1101 in binary form), and fourteen (1110 in binary form), there are four pairs of complementary values, namely: a first pair including the values one (0001 in binary form) and fourteen (1110 in binary form), a second pair including two (0010 in binary form) and thirteen (1101 in binary form), a third pair including seven (0111 in binary form) and eight (1000 in binary form), and a fourth pair including four (0100 in binary form) and eleven (1011 in binary form).

The identifiers are assigned to the data messages in the sequence of data messages based on the plurality of pairs of complementary identifier values in a preferred embodiment. In one such preferred embodiment, the identifiers are assigned to the data messages in the sequence of data messages such that the second value of each pair of complementary identifier values is assigned to one data message that is two data messages removed from another data message to which the first value of the pair of complementary identifier values is assigned in the context of one or more sequences of data messages. For example, with the four exemplary pairs of complementary identifier values described above, in one preferred embodiment the rolling count sequence is ordered with the first value being one (0001 in binary form), the second value being thirteen (1101 in binary form), the third value being four (0100 in binary form), the fourth value being fourteen (1110 in binary form), the fifth value being eight (1000 in binary form), the sixth value being eleven (1011 in binary form), the seventh value being two (0010 in binary form), and the eighth value being seven (0111 in binary form).

Accordingly, with respect to the above-referenced first pair of complementary identifier values, the value 14 (1110 in binary form, and considered to be the second value of the first pair in this example) is separated from its complementary value one (0001 in binary form, and considered to be the first value of the first pair in this example) by two other identifier values within a sequence of data messages. With respect to the above-referenced second pair of complementary identifier values, the number thirteen (1101 in binary form, and considered to be the second value of the second pair in this example) is separated from its complementary value two (0010 in binary form, and considered to be the first value of the second pair in this example) from an immediately prior sequence of data messages by two other identifier values. With respect to the above-referenced third pair of complementary identifier values, the number seven (0111, and considered to be the second value of the third pair in this example) is separated from its complementary value eight (1000, and considered to be the first value of the third pair in this example) by two other identifier values within a sequence of data messages. With respect to the above-referenced fourth pair of complementary identifier values, the number eleven (1011 in binary form, and considered to be the second value of the fourth pair in this example) is separated from the number four (0100 in binary form, and considered to be the first value of the fourth pair in this example) by two other identifier values in a sequence of data messages.

Accordingly, in such an embodiment, the first data message is assigned an identifier of 0001 in binary form (representing the decimal value one), the second data message is assigned an identifier of 1101 in binary form (representing the decimal value thirteen), the third data message is assigned an identifier of 0100 in binary form (representing the decimal value four), the fourth data message is assigned an identifier of 1110 in binary form (representing the decimal value fourteen), the fifth data message is assigned an identifier of 1000 in binary form (representing the decimal value eight), the sixth data message is assigned an identifier of 1011 in binary form (representing the decimal value eleven), the seventh data message is assigned an identifier of 0010 in binary form (representing the decimal value two), and the eighth data message is assigned an identifier of 0111 in binary form (representing the decimal value seven).

The assignment of identifiers then repeats with the same sequence for subsequent data messages. For example, in this embodiment, the ninth data message is assigned an identifier of 0001 in binary form (representing the decimal value one), the tenth data message is assigned an identifier of 1101 in binary form (representing the decimal value thirteen), the eleventh data message is assigned an identifier of 0100 in binary form (representing the decimal value four), the twelfth data message is assigned an identifier of 1110 in binary form (representing the decimal value fourteen), the thirteenth data message is assigned an identifier of 1000 in binary form (representing the decimal value eight), the fourteenth data message is assigned an identifier of 1011 in binary form (representing the decimal value eleven), the fifteenth data message is assigned an identifier of 0010 in binary form (representing the decimal value two), the sixteenth data message is assigned an identifier of 0111 in binary form (representing the decimal value seven), and so on. However, it will be appreciated that different assignment techniques may be used, for example using different pairs of complementary identifier values and/or switching the order of the respective values of one or more of the pairs of complementary identifier values.

Turning now to FIGS. 22-30, an effectiveness of such an ordered rolling count sequence based on decimal values will now be described. Specifically, FIG. 22 depicts a table 2200 of the ordered rolling count sequence in this exemplary embodiment as used for assigning identifiers to the data messages, while FIGS. 23-30 depict changes to the ordered rolling count sequence, and hence corresponding changes to the identifiers assigned to the data messages, in the event of specific types of memory fault errors. As will be explained further below, such changes in the identifiers can be recognized after transmission of the data messages to indicate the presence of such memory fault errors so that appropriate remedial action may be taken.

FIG. 23 depicts a table 2300 illustrating changes of the ordered rolling count sequence, and hence corresponding changes of the identifiers assigned to the data messages in the event of a zero level bit (labeled as Bit 0 in FIG. 23) being stuck at a value equal to zero in this exemplary embodiment. As shown in FIG. 23, in this exemplary embodiment, an error will be detected in four out of each eight data messages (namely, the first, second, sixth, and eighth data messages in each sequence of data messages). Also as shown in FIG. 23, a maximum of three data messages can be examined in sequence without detecting an error (for example, the third, fourth, and fifth data messages in a sequence of data messages).

FIG. 24 depicts a table 2400 illustrating changes of the ordered rolling count sequence, and hence corresponding changes of the identifiers assigned to the data messages in the event of a zero level bit (labeled as Bit 0 in FIG. 24) being stuck at a value equal to one in this exemplary embodiment. As shown in FIG. 24, in this exemplary embodiment, an error will be detected in four out of each eight data messages (namely, the third, fourth, fifth, and seventh data messages in each sequence of data messages). Also as shown in FIG. 24, a maximum of three data messages can be examined in sequence without detecting an error (for example, the eighth data message of one sequence of data messages and the first and second data messages of an immediately successive sequence of data messages).

FIG. 25 depicts changes of the ordered rolling count sequence, and hence corresponding changes of the identifiers assigned to the data messages in the event of a first level bit (labeled as Bit 1 in FIG. 25) being stuck at a value equal to zero in this exemplary embodiment. As shown in FIG. 25, in this exemplary embodiment, an error will be detected in four out of each eight data messages (namely, the fourth, sixth, seventh, and eighth data messages in each sequence of data messages). Also as shown in FIG. 25, a maximum of three data messages can be examined in sequence without detecting an error (for example, the first, second, and third data messages in a sequence of data messages).

FIG. 26 depicts changes of the ordered rolling count sequence, and hence corresponding changes of the identifiers assigned to the data messages in the event of a first level bit (labeled as Bit 1 in FIG. 26) being stuck at a value equal to one in this exemplary embodiment. As shown in FIG. 26, in this exemplary embodiment, an error will be detected in four out of each eight data messages (namely, the first, second, third, and fifth data messages in each sequence of data messages). Also as shown in FIG. 26, a maximum of three data messages can be examined in sequence without detecting an error (for example, the sixth, seventh, and eighth data messages in a sequence of data message).

FIG. 27 depicts changes of the ordered rolling count sequence, and hence corresponding changes of the identifiers assigned to the data messages in the event of a second level bit (labeled as Bit 2 in FIG. 27) being stuck at a value equal to zero in this exemplary embodiment. As shown in FIG. 27, in this exemplary embodiment, an error will be detected in four out of each eight data messages (namely, the second, third, fourth, and eighth data messages in each sequence of data messages). Also as shown in FIG. 27, a maximum of three data messages can be examined in sequence without detecting an error (for example, the fifth, sixth, and seventh data messages of a sequence of data messages).

FIG. 28 depicts changes of the ordered rolling count sequence, and hence corresponding changes of the identifiers assigned to the data messages in the event of a second level bit (labeled as Bit 2 in FIG. 28) being stuck at a value equal to one in this exemplary embodiment. As shown in FIG. 28, in this exemplary embodiment, an error will be detected in four out of each eight data messages (namely, the first, fifth, sixth, and seventh data messages in each sequence of data messages). Also as shown in FIG. 28, a maximum of three data messages can be examined in sequence without detecting an error (for example, the second, third, and fourth data messages in a sequence of data messages).

FIG. 29 depicts changes of the ordered rolling count sequence, and hence corresponding changes of the identifiers assigned to the data messages in the event of a third level bit (labeled as Bit 3 in FIG. 29) being stuck at a value equal to zero in this exemplary embodiment. As shown in FIG. 29, in this exemplary embodiment, an error will be detected in four out of each eight data messages (namely, the second, fourth, fifth, and sixth data messages in each sequence of data messages). Also as shown in FIG. 29, a maximum of three data messages can be examined in sequence without detecting an error (for example, the seventh and eighth data messages in one sequence of data messages and the first data message in an immediately subsequent sequence of data messages).

FIG. 30 depicts changes of the ordered rolling count sequence, and hence corresponding changes of the identifiers assigned to the data messages in the event of a third level bit (labeled as Bit 3 in FIG. 30) being stuck at a value equal to one in this exemplary embodiment. As shown in FIG. 30, in this exemplary embodiment, an error will be detected in four out of each eight data messages (namely, the first, third, seventh, and eighth data messages in each sequence of data messages). Also as shown in FIG. 30, a maximum of three data messages can be examined in sequence without detecting an error (for example, the fourth, fifth, and sixth data messages in a sequence of data messages).

As shown in each of these exemplary embodiments of the ordering of the rolling count sequence, an error will be detected in four out of each eight data messages in a sequence of data messages in each of these three exemplary embodiments, such that a maximum of four data messages can be examined in sequence without detecting an error of the types described above in which a binary digit value is stuck at a particular value of zero or one. Also, in the third embodiment referenced above, involving the strategic ordering of pairs of complementary identifier values, a maximum of three data messages can be examined in sequence without detecting any of these types of errors.

Returning again to FIG. 3, a checksum is calculated for each data message (step 310), and the data messages are generated (step 312). In a preferred embodiment, each data message includes data, an identifier, and a checksum, such as those described above. The checksum provides additional protection against memory fault errors. In a preferred embodiment, the checksum is calculated and the message is generated by a computer system, such as the computer system 200 of FIG. 2 and/or the first computer system 110 of the transmitter 102 of FIG. 1, preferably by a processor, such as the processor 206 depicted in FIG. 2. In one preferred embodiment, each checksum represents a calculation based on the data and the identifier of a corresponding data message. In other embodiments, each checksum may represent a calculation based solely on the data of a corresponding data message.

The data messages are then transmitted (step 314) and received (316). In a preferred embodiment, the data messages are transmitted by the transmitter 102 of FIG. 1, for example by the first computer system 110 thereof, and are received by the receiver 104 of FIG. 1, for example using the second computer system 112 thereof. Preferably, data messages are continually generated, encoded, transmitted, and received in sequence throughout the process, for example as new data, information, and/or instructions are obtained. For example, in one exemplary embodiment, a new encoded data message is generated in this manner and transmitted along the data connection 106 of FIG. 1 every 250 milliseconds, so that the respective data messages are spaced apart accordingly in a continuous, repeated loop with continuously updated values based on the data. However, this may vary in other embodiments.

The data messages are then interpreted (step 318). The interpretation of the data messages preferably includes identification of each data message and ascertaining any instructions or other information provided in each data message. In a preferred embodiment, the data messages are continuously interpreted as they are received by the receiver 104 of FIG. 1. Also in a preferred embodiment, the data messages are interpreted by the second computer system 112 of FIG. 2, preferably by a processor thereof, such as the processor 206 of FIG. 2.

In addition, a determination as made as to whether there are any errors reflected in the identifiers that have been assigned to the data messages pursuant to an ordered rolling count strategy, such as those described above (step 320). In a preferred embodiment, this step includes determining whether any of the identifiers for the data messages appear out of order based on a particular rolling count ordered sequence, and/or whether any of the identifiers for the data messages include any unexpected values. For example, if an identifier for a data message includes a value that is not expected within a particular rolling count sequence, then such identifier would be considered to include an unexpected or an undefined value. In a preferred embodiment, this determination is made by the second computer system 112 of the receiver 104 of FIG. 1, preferably by a processor thereof, such as the processor 206 depicted in FIG. 2. Also in a preferred embodiment, such a processor 206 and/or another device may count the number of such identifier or rolling count errors, which may then affect the nature of the remedial action taken, for example as described below.

If it is determined that there is such an error represented by the identifiers of the data messages and/or the rolling count sequence used in conjunction therewith, then appropriate remedial action is taken (step 322). In a preferred embodiment, such remedial action may include disregarding one or more of the data messages to which the errors apply and/or terminating one or more vehicle functions, modules, and/or instructions pertaining to such data messages. In various embodiments, any number of different types of remedial action may be implemented. In a preferred embodiment, the remedial action is implemented at least in part by instructions provided by the second computer system 112 of the receiver 104 of FIG. 1, preferably by a processor thereof, such as the processor 206 depicted in FIG. Also in a preferred embodiment, the nature of the remedial action taken in step 322 may depend on the number of identifier or rolling count errors detected in step 320, among other possible factors.

In addition, a determination is made as to whether there are any errors reflected in the checksums of the data messages (step 324). For example, in a preferred embodiment, a new checksum is calculated after each data message is received and is then compared with the previously-calculated checksum for the data message. In a preferred embodiment, this determination is made by the second computer system 112 of the receiver 104 of FIG. 1, preferably by a processor thereof, such as the processor 206 depicted in FIG. 2.

If it is determined that there is such an error in the checksum for one or more of the data messages, then the process proceeds to the above-described step 322, in which remedial action is taken. In one preferred embodiment, such as that depicted in FIG. 3, similar remedial action may be taken if there is an error with the identifiers/rolling count sequence or if there is an error with the checksum of one or more of the data messages. However, in other embodiments, different types of remedial action may be taken for such different types of errors.

If it is determined that that there are no such errors, then the data messages are implemented without remedial action (step 326). For example, in a preferred embodiment, such data message implementation includes processing of the information and data included in the data messages and implementing any instructions provided in the data messages. In a preferred embodiment, such data message implementation is implemented at least in part by instructions provided by the second computer system 112 of the receiver 104 of FIG. 1, preferably by a processor thereof, such as the processor 206 depicted in FIG. 2. In addition, in certain embodiments the data messages may still be implemented and/or the instructions of the data messages followed in step 326 even if there are one or more errors detected in step 320 and/or step 324. In such cases, the implementation of the data messages and/or the following of the instructions therein may be adjusted by the above-referenced remedial action of step 322.

It will be appreciated that certain steps of the communications process 300 may vary. In addition, it will similarly be appreciated that various steps of the communications process 300 may be repeated continuously throughout the communications process 300, for example as referenced above. It will also be appreciated that certain steps of the communications process 300 may be performed simultaneously to one another and/or in an order that is different from the order depicted in FIG. 3 and/or described herein in connection therewith.

Figure 31:
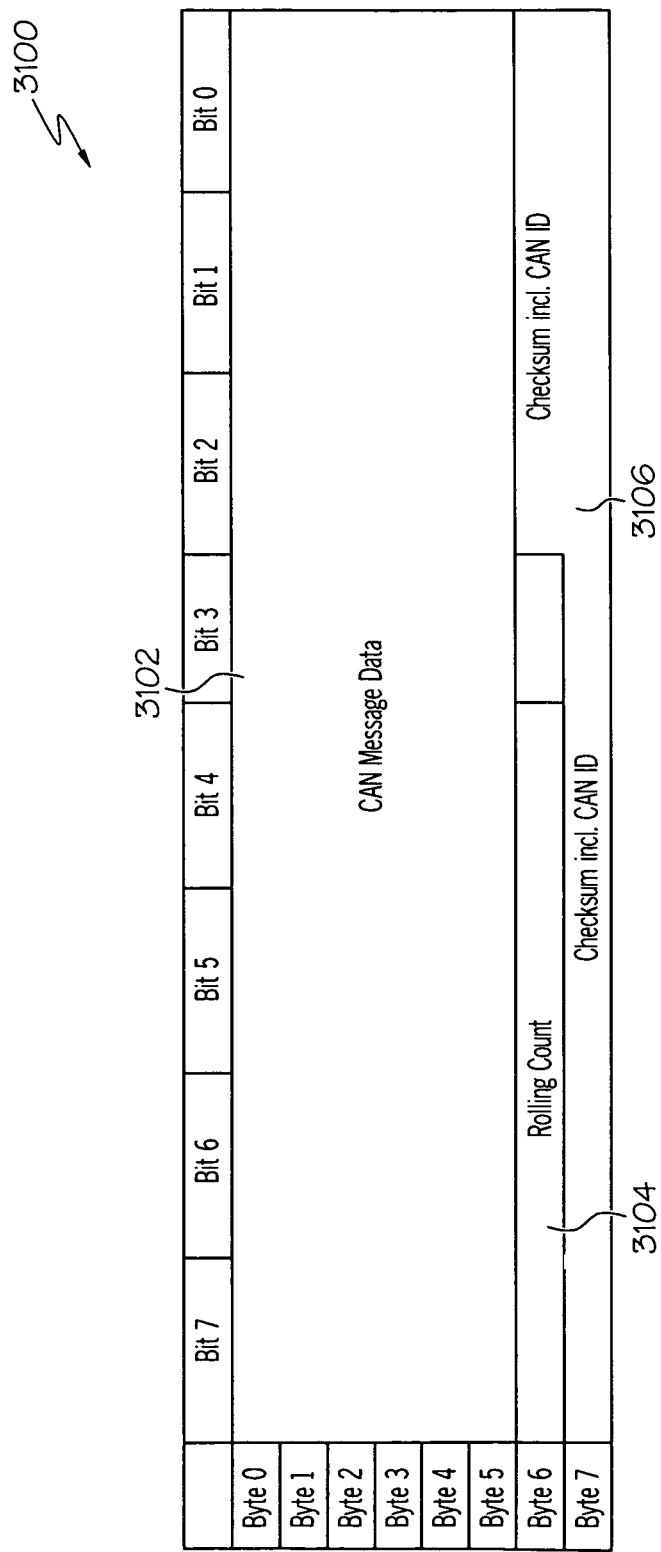
FIG. 31 depicts a data message featuring message data, a rolling count, and a checksum, and that can be generated by the communications system of FIG. 1 and/or the computer system of FIG. 2 using the communications process of FIG. 3, in accordance with an exemplary embodiment of the present invention.

FIG. 31 depicts an exemplary data message 3100 that can be used in connection with the communications system 100, the computer system 200, and the communications process 300, in accordance with an exemplary embodiment of the present invention. In a preferred embodiment, the data message 3100 corresponds to one of the data messages 108 of FIG. 1. Also in a preferred embodiment, the data message 3100 is generated by the first computer system 110 for the transmitter 102 of FIG. 1 in accordance with the steps of the communications process 300 of FIG. 3.

As depicted in FIG. 31, the exemplary data message 3100 includes message data 3102, a rolling count 3104, and a checksum 3106. The message data 3102 preferably comprises some or all of the data obtained in step 302 of the communications process 300 of FIG. 3. In the depicted embodiment, the message data 3102 uses forty binary digits in the data message 3100. The rolling count 3104 preferably includes the message identifiers assigned in step 308 of the communications process 300 of FIG. 3 based on the rolling count sequence selected in step 304 of the communications process 300. In the depicted embodiment, the rolling count includes four binary digits in the data message 3100. The checksum 3106 preferably comprises a checksum calculated in step 310 of the communications process 300 of FIG. 3. In the depicted embodiment, the checksum 3106 is calculated based on both the message data 3102 and the rolling count 3104, and uses eleven binary digits in the data message 3100. However, the checksum 3106 may be calculated differently in other embodiments. Also, in other embodiments the format of the data message 3100 may vary, for example in that the message data 3102, the rolling count 3104, and/or the checksum 3106 may use a different number of binary digits.

The data message 3100 of FIG. 31 provides greater protection against memory fault errors as compared with typical data messages that include a checksum and a typical message identifier with two binary digits. For example, with the improved rolling count 3104 and associated message identifiers such as those described above, the data message 3100 potentially provides additional protection against individual data message bits being stuck at a particular value, as well as against other possible memory fault errors such as nibble, byte, word, and/or double word faults. Moreover, the data message 3100 (and the communications system 100, the computer system 200, and the communications process 300 of FIGS. 1-3, respectively used to create the data message 3100) allows for such potentially improved protection without requiring additional binary digits for security, for example as compared with a traditional data message that includes a two digit message identifier and a two digit security enumeration (for example, a one's complement) for the message identifier.

Accordingly, an improved method has been provided for securing data and data messages in vehicles, for example that can potentially protect against a broader range of possible memory fault errors without utilizing additional binary digits as compared with many traditional messages. Also, an improved program product has also been provided for securing data and data messages in vehicles, for example that can potentially protect against a broader range of possible memory fault errors without utilizing additional binary digits as compared with many traditional messages. In addition, improved control systems and computer systems have been provided for securing data and data messages in vehicles, for example that can potentially protect against a broader range of possible memory fault errors without utilizing additional binary digits as compared with many traditional messages.

It will be appreciated that the processes, programs, and systems described herein may vary in certain embodiments. It will similarly be appreciated that various steps of the processes and programs described herein may be performed simultaneously and/or in a different order than that presented in the figures and/or described herein, and that the methods, programs, and systems described herein may also be utilized and/or implemented in connection with any number of other different types of devices, systems, processes, and/or programs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for securing vehicle data comprising a plurality of data messages for a vehicle, the method comprising the steps of:
   determining a sequence for the plurality of data messages via a processor;
   selecting a plurality of identifier values for the plurality of data messages such that each of the plurality of identifier values are at least two bit errors removed from another via the processor; and
   assigning one of the plurality of identifier values to each of the plurality of data messages, based at least in part on the sequence via the processor.

2. The method of claim 1, wherein each of the plurality of identifier values has a decimal value in decimal form that together form a decimal value sequence, and the step of assigning one of the plurality of identifier values to each of the plurality of data messages comprises:
   assigning one of the plurality of identifier values to each of the plurality of data messages based at least in part on the decimal value sequence.

3. The method of claim 1, wherein the plurality of identifier values is based upon a gray code representing an ordered sequence of binary digit changes to an initial value, and the step of assigning one of the plurality of identifier values to each of the plurality of data messages comprises:
   assigning one of the plurality of identifier values to each of the plurality of data messages based at least in part on the gray code.

4. The method of claim 1, wherein the plurality of identifier values comprises a plurality of pairs of complementary identifier values, each pair of complementary identifier values comprising a first value and a second value that, in binary form, is a mirror image of the first value in binary form, and the step of assigning one of the plurality of identifier values to each of the plurality of data messages comprises:
   assigning one of the plurality of identifier values to each of the plurality of data messages based at least in part on the plurality of pairs of complementary identifier values.

5. The method of claim 4, wherein the step of assigning one of the plurality of identifier values to each of the plurality of data messages based at least in part on the plurality of pairs of complementary identifier values comprises:
   assigning one of the plurality of identifier values to each of the plurality of data messages based at least in part on the plurality of pairs of complementary identifier values such that the second value of each pair of complementary identifier values is assigned to one of the plurality of data messages that is two data messages removed from another of the plurality of data messages to which the first value of the pair of complementary identifier values is assigned.

6. The method of claim 1, wherein the step of assigning one of the plurality of identifier values to each of the plurality of data messages comprises the step of:
   assigning one of the plurality of identifier values to each of the plurality of data messages, based on an order of a rolling count sequence for the plurality of data messages.

7. The method of claim 1, further comprising the steps of:
   taking remedial action if there is an assignment error in the assignment of the plurality of identifier values;
   calculating a checksum based at least in part on the plurality of data messages; and
   taking remedial action if there is a checksum error represented in the checksum.

8. A non-transient computer readable program product for securing vehicle data comprising a plurality of data messages, the program product comprising:
   (a) a program configured to at least facilitate:
      determining a sequence for the plurality of data messages;
      selecting a plurality of identifier values for the plurality of data messages such that each of the plurality of identifier values are at least two bit errors removed from another; and
      assigning one of the plurality of identifier values to each of the plurality of data messages, based at least in part on the sequence; and
   (b) a non-transient computer-readable signal bearing media bearing the program.

9. The non-transient computer readable program product of claim 8, wherein each of the plurality of identifier values has a decimal value in decimal form that together form a decimal value sequence, and the program is configured to at least facilitate assigning one of the plurality of identifier values to each of the plurality of data messages based at least in part on the decimal value sequence.

10. The non-transient computer readable program product of claim 8, wherein the plurality of identifier values is based upon a gray code representing an ordered sequence of binary digit changes to an initial value, and the program is further configured to at least facilitate assigning one of the plurality of identifier values to each of the plurality of data messages based at least in part on the gray code.

11. The non-transient computer readable program product of claim 8, wherein the plurality of identifier values comprises a plurality of pairs of complementary identifier values, each pair of complementary identifier values comprising a first value and a second value that, in binary form, is a mirror image of the first value in binary form, and the program is configured to at least facilitate assigning one of the plurality of identifier values to each of the plurality of data messages based at least in part on the plurality of pairs of complementary identifier values.

12. The non-transient computer readable program product of claim 11, wherein the program is configured to at least facilitate assigning one of the plurality of identifier values to each of the plurality of data messages based at least in part on the plurality of pairs of complementary identifier values such that the second value of each pair of complementary identifier values is assigned to one of the plurality of data messages that is two data messages removed from another of the plurality of data messages to which the first value of the pair of complementary identifier values is assigned.

13. The non-transient computer readable program product of claim 8, wherein the program is configured to at least facilitate assigning one of the plurality of identifier values to each of the plurality of data messages, based on an order of a rolling count sequence for the plurality of data messages.

14. A communications system for securing data comprising a plurality of data messages pertaining to a vehicle, the communications system comprising a transmitter module comprising:
    an interface configured to at least facilitate obtaining the plurality of data messages; and
    a processor coupled to the interface, the processor configured to at least facilitate:
        determining a sequence for the plurality of data messages;
        selecting a plurality of identifier values for the plurality of data messages such that each of the plurality of identifier values are at least two bit errors removed from another; and
        assigning one of the plurality of identifier values to each of the plurality of data messages, based at least in part on the sequence.

15. The communications system of claim 14, wherein each of the plurality of identifier values has a decimal value in decimal form that together form a decimal value sequence, and the processor is configured to at least facilitate assigning one of the plurality of identifier values to each of the plurality of data messages based at least in part on the decimal value sequence.

16. The communications system of claim 14, wherein the plurality of identifier values is based upon a gray code representing an ordered sequence of binary digit changes to an initial value, and the processor is further configured to at least facilitate assigning one of the plurality of identifier values to each of the plurality of data messages based at least in part on the gray code.

17. The communications system of claim 14, wherein the plurality of identifier values comprises a plurality of pairs of complementary identifier values, each pair of complementary identifier values comprising a first value and a second value that, in binary form, is a mirror image of the first value in binary form, and the processor is configured to at leas facilitate assigning one of the plurality of identifier values to each of the plurality of data messages based at least in part on the plurality of pairs of complementary identifier values.

18. The communications system of claim 17, wherein the processor is configured to at least facilitate assigning one of the plurality of identifier values to each of the plurality of data messages based at least in part on the plurality of pairs of complementary identifier values such that the second value of each pair of complementary identifier values is assigned to one of the plurality of data messages that is two data messages removed from another of the plurality of data messages to which the first value of the pair of complementary identifier values is assigned.

19. The communications system of claim 14, further comprising:
    a receiver module coupled to the transmitter module and configured to at least facilitate:
        receiving the plurality of data messages; and
        taking remedial action with respect to the vehicle if there is an assignment error in the assignment of the plurality of identifier values.

20. The communications system of claim 19, wherein:
    the processor is further configured to at least facilitate assigning one of the plurality of identifier values to each of the plurality of data messages, based on an order of a rolling count sequence for the plurality of data messages.

* * * * *